United States Patent [19]

Nakata et al.

[11] 4,387,289

[45] Jun. 7, 1983

[54] CONTROL SYSTEM FOR RESISTANCE WELDING

[75] Inventors: Shuji Nakata, Toyonaka; Masahiro Nishikawa, Sakai; Yoshio Kawaguchi, Yokohama, all of Japan

[73] Assignee: Nissan Motor Company, Limited, Kanagawa, Japan

[21] Appl. No.: 287,178

[22] Filed: Jul. 27, 1981

Related U.S. Application Data

[62] Division of Ser. No. 177,363, Aug. 11, 1980, abandoned.

[51] Int. Cl.³ .................................... B23K 11/24
[52] U.S. Cl. .................................. 219/110; 219/114; 219/117.1
[58] Field of Search ............... 219/108, 109, 110, 114, 219/115, 117.1

[56] References Cited

U.S. PATENT DOCUMENTS 3,068,350 12/1962 Archer .............................. 219/110
3,582,967 6/1971 Beckman et al. .................. 219/110

FOREIGN PATENT DOCUMENTS 1113767 9/1961 Fed. Rep. of Germany .
2346561 8/1975 Fed. Rep. of Germany .
590107 1/1978 U.S.S.R. .

OTHER PUBLICATIONS

"Soviet Inventions Illustrated," dated Jan. 24, 1979, pp. 26 and 27 of the section Metallurgy.

Primary Examiner—C. C. Shaw
Attorney, Agent, or Firm—Lowe, King, Price & Becker

[57] ABSTRACT

A system for resistance welding in which the welding voltage between the electrodes is controlled by changing the pressure applied to the electrodes or the firing phase angle of the welding current in accordance with a reference voltage curve or a reference voltage integration curve. The system comprises a voltage sensor, a reference voltage generator, a differential amplifier, and a pressure control device, or a calculating unit for determining an appropriate firing phase angle of the welding current. The system thus improved can ensure a stable, good welding quality, since the welding voltage is always controlled by a series of optimum welding voltages, during the welding process, in accordance with a reference voltage curve with respect to time, preferably in terms of cycles of the welding current.

4 Claims, 12 Drawing Figures

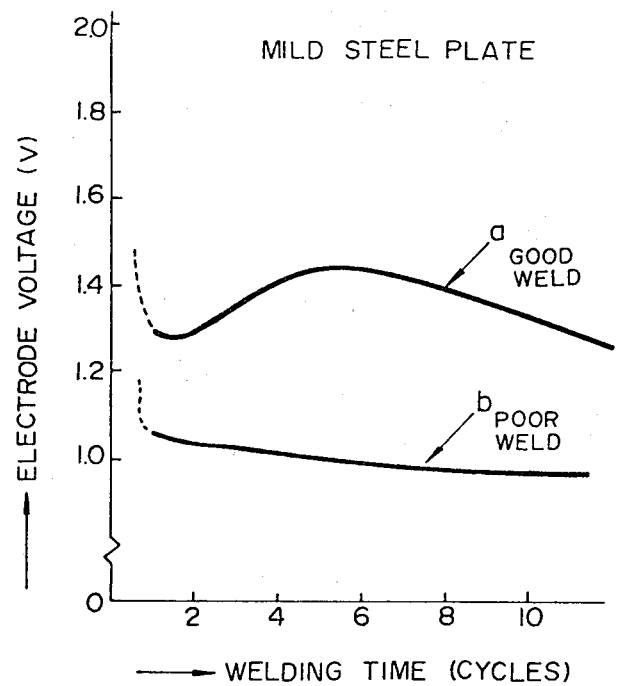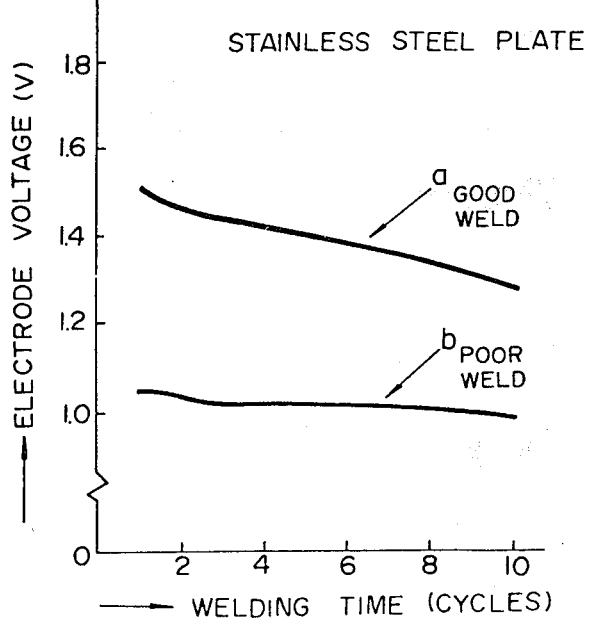

CONTROL SYSTEM FOR RESISTANCE WELDING

This is a division of application Ser. No. 177,363, filed Aug. 11, 1980, now abandoned.

BACKGROUND OF THE INVENTION

1. Field of the Invention

The present invention relates generally to a control system for resistance welding, and more specifically to an automatic welding voltage control system such that the welding voltage between a pair of electrodes can be controlled by changing the welding pressure or current applied to the electrodes in accordance with a reference voltage curve or a reference voltage integration curve.

2. Description of the Prior Art

In resistance welding, the welding quality is susceptible to change according to various welding conditions such as welding current, voltage, resistance, and the pressure between electrodes. Conventionally, therefore, there have been various testing systems for monitoring welding current, voltage, resistance, pressure, and so on between the two electrodes, and other systems for monitoring welded portions by using ultrasonic waves, for example, in order to check the quality of spot-welding. However, these monitoring methods or apparatus can only judge whether the quality of the welded portions is satisfactory after the welding process, and therefore cannot insure the quality of welding during the welding process.

With conventional resistance welding systems as explained above, therefore, if the welding is poor in quality, it is necessary to correct or repair the welded portion, or to discard the parts or products in the worst case where the welding quality is beyond repair.

BRIEF DESCRIPTION OF THE INVENTION

With these problems in mind, therefore, it is the primary object of the present invention to provide a control system for resistance welding whereby a stable good welding quality can be obtained automatically because of the manner of control of welding voltage during the welding process, taking into consideration good adaptability to various welding conditions.

A number of experiments have indicated the following two results with regard to resistance welding:

(1) The welding voltage applied to two electrodes between which materials to be welded are pinched (including electrode chips in the case of spot welding) has a close relationship to the rise in temperature at the welded portion and to the diameter of the nugget formed; that is to say, the strength of the welding.

(2) A voltage curve with respect to welding time for obtaining a good welding quality can be selectively determined according to welding factors such as material, shape, thickness, etc.

Therefore, if the welding voltage between the electrodes can be varied in accordance with a reference voltage curve, it is possible to produce a constant nugget diameter with constant strength and good welding quality.

In this case, as the reference curve, it is possible to consider the following two kinds of curve:

(1) A reference voltage curve with respect to welding time, either in real time or in cycles of the supplied current.

(2) A reference voltage integration curve with respect to welding time, especially when the supply voltage fluctuations are relatively large.

To achieve the above-mentioned objects and methods, the control system for resistance welding of the present invention comprises a voltage sensor, a reference voltage generator storing a reference curve, a differential amplifier for outputting a control signal according to the differential voltage between the two, and a pressure control device for controlling welding pressure or a calculating unit for outputting a firing phase angle control signal in response to the control signal, so that the welding voltage can be controlled in accordance with the reference voltage curve in order to obtain good welding quality.

BRIEF DESCRIPTION OF THE DRAWINGS

The features and advantages of the system for resistance welding according to the present invention will be more clearly appreciated from the following description taken in conjunction with the accompanying drawings in which like reference numerals designate corresponding elements, and in which:

FIG. 1 is a graphical representation of example relationships between electrode voltage and welding time for the case where two mild-steel plates are spot-welded;

FIG. 2 is a graphical representation of example relationships between electrode voltage and welding time for the case where two stainless-steel plates are spot-welded;

DETAILED DESCRIPTION OF THE PREFERRED EMBODIMENTS

Usually, whenever two plates are spot-welded together by using a spot welding apparatus, the welding strength largely depends upon the voltage between both the electrodes, and more particularly upon the function of voltage with respect to the welding time, commonly measured in terms of cycles of the current supplied.

FIG. 1 shows typical example relationships between the voltage between the electrodes and welding time (hereinafter referred to simply as "a voltage curve") where two 1 mm thick mild-steel plates are spot-welded. In this figure, in the case of the voltage curve (a) the tensile strength is about 700 kg at the welded portion and therefore the welding quality is acceptable; however, in the case of the voltage curve (b) the tensile strength is about 60 kg and therefore the welding quality is not acceptable.

In addition, when regarded as a function between electrode voltage and time, in the case of the curve (a) where the voltage between the electrodes varies according to welding time, a strong nugget is formed, but however, in the case of the curve (b) where the voltage is substantially constant, almost no nugget is formed at the welded portion and therefore the welding quality is not acceptable.

FIG. 2 shows a typical example relationships between the voltage between the electrodes and time where two 0.8 mm thick stainless-steel plates are spot-welded, being similar to FIG. 1. p As in FIG. 1, in the case of curve (a) where voltage between the electrodes varies with time, a good quality is achieved at the welded portion with enough tensile strength, but, in the case of the curve (b) where the voltage does not vary appreciably, a poor quality is achieved with insufficient tensile strength.

As described above, since the welding quality is much affected by the function of electrode voltage with respect to time, it will be possible to obtain a good stable welding quality for the welded portion, if the welding voltage can be controlled so as to vary in accordance with a desired reference welding voltage curve as shown by (b) in FIGS. 1 and 2. In this case, it is, of course, necessary to determine an optimum reference voltage curve after due consideration of various factors such as material, shape, and thickness.

The voltage between the electrodes can be controlled by the pressure applied to the electrodes, because the contact resistance therebetween varies sharply according to the pressure on the electrodes.

Figure 3:
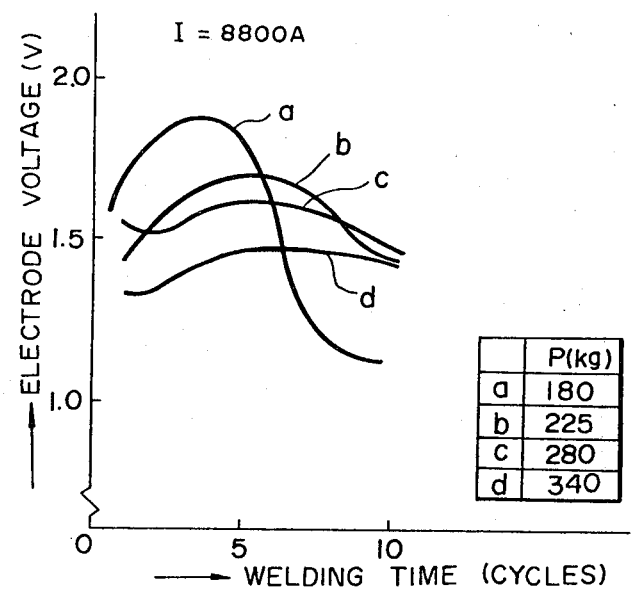
FIG. 3 is a graphical representation of relationships between electrode voltage and welding time where only the pressure applied to the electrodes is changed with the current held constant.

FIG. 3 shows variations in voltage between the electrodes when pressure on the electrodes is changed from 180 kg to 340 kg while a constant welding current of 8800 A is flowing.

As depicted by the curves (a) to (d) in the figure, the voltage between the electrodes decreases as a whole with increasing pressure on the electrodes. In this case, it has also been found that the nugget diameter decreases as the pressure on the electrodes increases. This is because the contact area formed between two plates and the thermal transmissibility between each electrode and each plate increase with increasing pressure applied to the electrodes.

Figure 4:
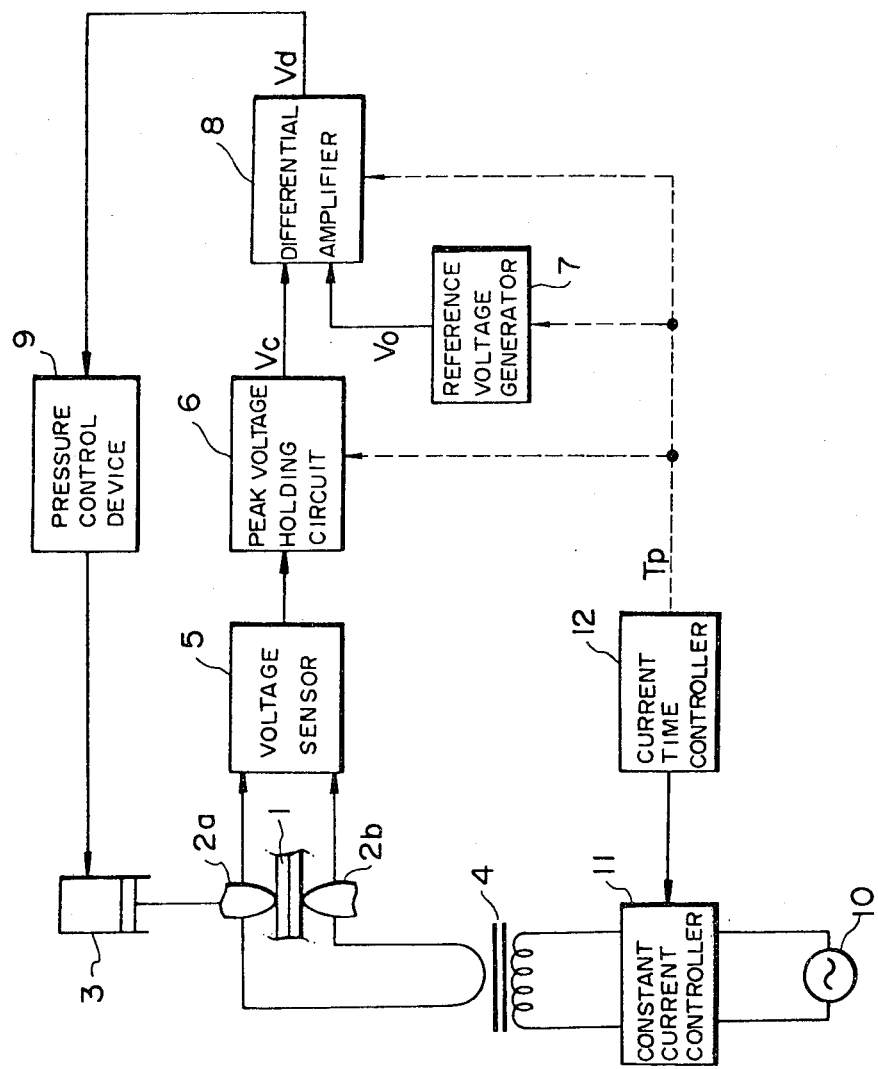
FIG. 4 is a schematic block diagram of the system of a first embodiment of the present invention.

Moreover, the reason why the voltage curve (a) in FIG. 3 (P=180 kg) drops sharply from the fourth cycle is that some flash is produced because of lack of pressure. Turning now to FIG. 4, a first preferred embodiment of the present invention is shown in the form of a block diagram.

In this figure, numeral 1 denotes a pair of members to be welded, 2a denotes a movable electrode associated with a piston 3, and 2b denotes a fixed electrode. A pressure is applied to the movable electrode by the piston 3, during the welding process, with the members pinched between the two electrodes through which a welding current is conducted from a transformer 4. Numeral 5 denotes a voltage sensor to detect the instantaneous voltage between the electrodes 2a and 2b when the welding current is flowing therebetween (referred to simply as electrode voltage) and to rectify the detected voltage. Numeral 6 denotes a peak voltage holding circuit which retains the peak voltage value of each detected half-wave cycle. Numeral 7 denotes a reference voltage generator in which a reference voltage curve is previously stored in the form of a function of electrode voltage with respect to time so as to obtain a desirable welding quality. Numeral 8 denotes a different amplifier to compare the output voltage $V_c$ from the peak voltage holding circuit 6 with that $V_o$ from the reference voltage generator 7 and to output signals $V_d$ corresponding to the difference between the two. Numeral 9 denotes a pressure control device to control the pressure applied to the electrodes 2a and 2b, so that the differential voltage $V_d$ may be zero, by controlling the piston 3, as described in more detail below.

In addition, numeral 10 denotes an AC power supply, 11 denotes a constant current controller, and 12 denotes a current time controller to output start and stop signals to the constant current controller 11 in order to supply the welding current for the necessary time period. The current time control 12 further sends out a timing signal $T_p$, for synchronization with other units, after the current begins to flow, by way of the dashed lines shown in FIG. 4.

In this embodiment, while the welding current is flowing, the welding voltage is continuously detected by the voltage sensor 5; each half-wave peak value $V_c$ of the detected electrode voltage is output from the peak voltage holding circuit 6; each peak value $V_c$ is next compared with the voltage $V_o$ based on a reference voltage curve generated from the reference voltage generator 7 by the differential amplifier 8. Then the pressure control device 9 controls the pressure on the electrodes 2a and 2b by actuating the piston 3 in accordance with the signal $V_d$ in proportion to the voltage difference. In this case, the electrode voltage decreases with increasing pressure applied thereto, and increases with decreasing pressure. Since the electrode voltage is controlled within an allowable range in accordance with the above reference voltage curve while the current is flowing between the electrodes, it is possible to obtain a good quality nugget at all times.

In addition, although an abnormally large electrode voltage is sometimes detected due to an increase in contact resistance between a pair of welded plates immediately after the welding current begins to flow, this voltage does not affect the quality of the welded portion. Therefore, in order to prevent erroneous operation caused by this spurious voltage, it is desirable not to use the output signal from the differential amplifier 8 during the starting period. For this reason, immediately after the current starts flowing, the system is so designed that timing signal $T_p$ sent out from the current time controller 12 can suppress the output from the differential amplifier 8 for several cycles, and the pressure control device 9 can be controlled so that the piston 3 applies a predetermined pressure to the electrodes 2a and 2b for this period only. If an electric hydraulic servo valve is used for this purpose, it is not difficult to control the pressure up to about 50 Hz with adequate frequency response characteristics.

Figure 5:
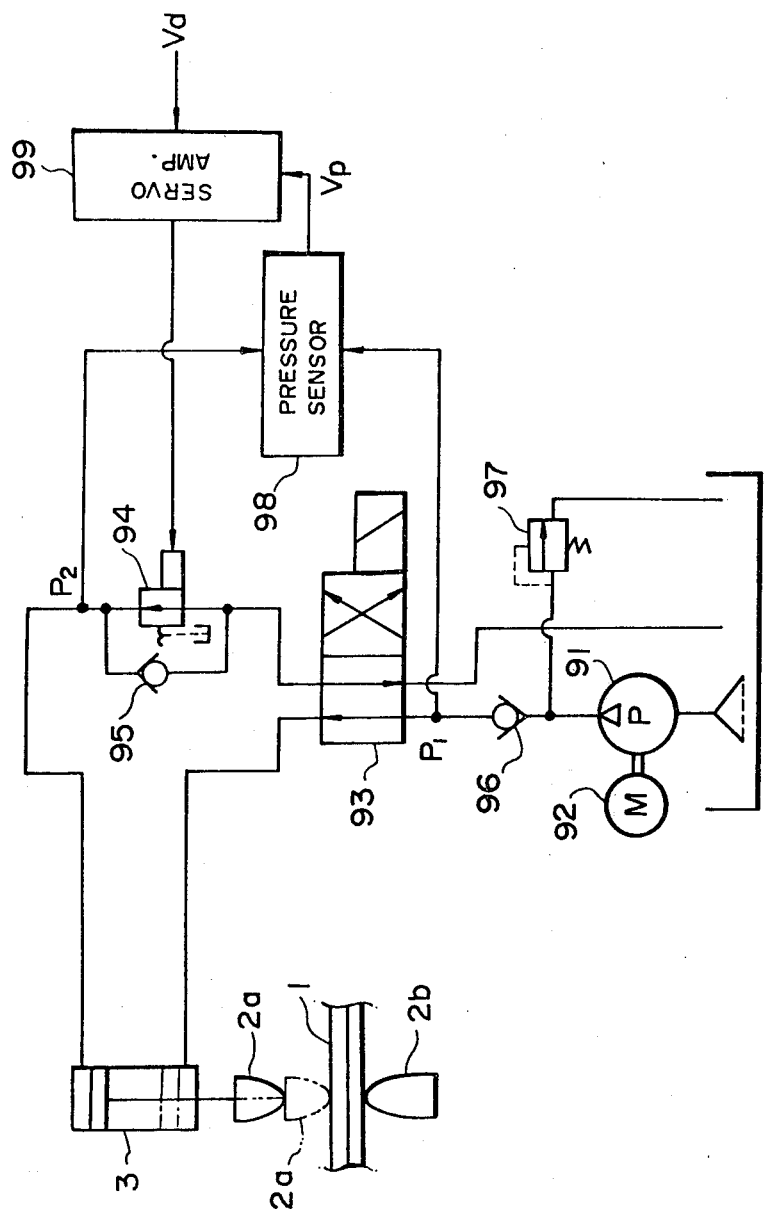
FIG. 5 is a schematic diagram of a pressure control device used with the present invention.

FIG. 5 shows a schematic diagram of the pressure control device 9 used with the embodiments of the present invention.

In this figure, numeral 91 denotes a hydraulic pump driven by a motor 92, 93 denotes a direction changeover valve, 94 denotes a proportional pressure reduction valve for adjusting the pressure, 95 and 96 denote one-way valves, and 97 denotes a relief valve. In addition, numeral 98 denotes a pressure sensor to detect the pressure applied to the piston 3 depending on the pressure difference between the pressure gage ports $P_1$ and $P_2$, and numeral 99 denotes a servo amplifier to amplify the signal for controlling the proportional pressure reduction valve 94 in response to the signal $V_d$ from the differential amplifier 8, with the signal $V_p$ from the pressure sensor 98 as a feedback signal.

These elements described above are connected to each other by using appropriate hydraulic pipes so as to form a hydraulic system.

In FIG. 5, if the direction change-over valve 93 is set so that fluid flows in the direction shown in the figure, then the fluid pressure is applied from the lower side of the cylinder chamber to the piston 3 to push up the movable electrode 2a; if, however, the valve 93 is switched to the reverse direction by the signal from a control panel (not shown), the pressure supplied by the hydraulic pump 91 is applied from the upper side of the cylinder chamber to the piston 3 through the proportional pressure reduction valve 94 to push down the movable electrode 2a, so that additional pressure is applied to the members 1 to be welded as shown by phantom lines in FIG. 5. In this case, the additional pressure is continuously decreased or increased in response to the signal $V_d$ from the differential amplifier 8 since the proportional pressure reduction valve 94 is also controlled by the servo amplifier 99 in response to the signal $V_d$, forming a closed loop control system with the signal $V_p$ as a feedback signal.

Figure 6:
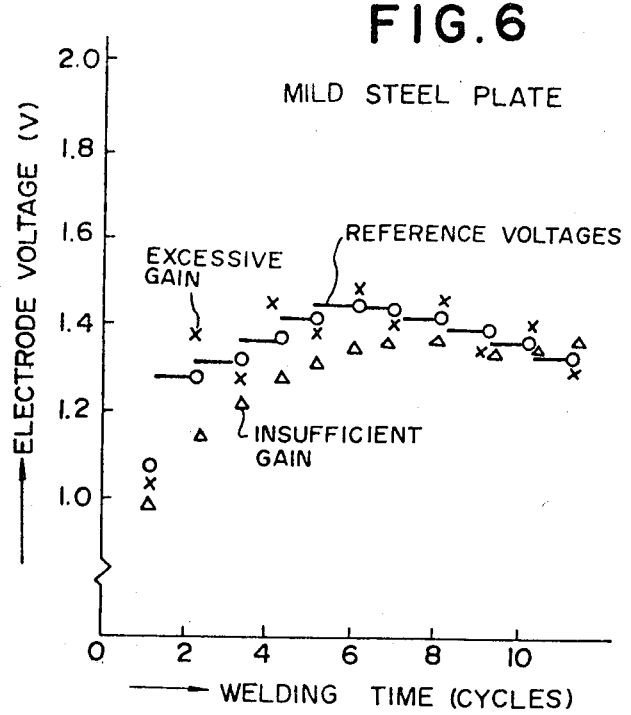
FIG. 6 is a graphical representation of a relationship between electrode voltage and welding time where two mild-steel plates are spot-welded by using the system shown in FIG. 4, in which step-like reference voltages and half-wave peak values of electrode voltage are plotted.
Figure 7:
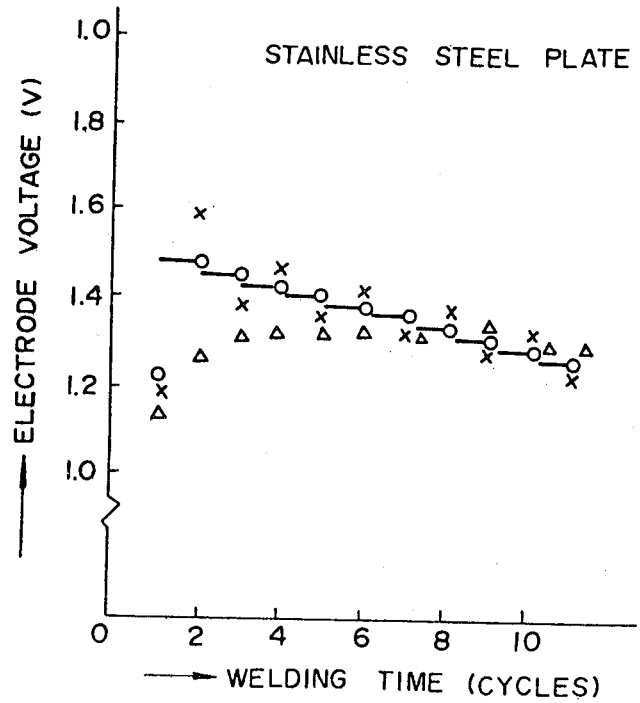
FIG. 7 is a graphical representation of a relationship between electrode voltage and welding time where two stainless-steel plate are spot-welded by using the system shown in FIG. 4, in which step-like reference voltages and half-wave peak values of electrode voltage are plotted.

FIG. 6 shows an example of the correspondence between a series of reference voltages based on a reference voltage curve (horizontal bars) and the half-wave peak values of detected electrode voltage (points shown by marks o, x, and Δ) when two mild steel plates are spot-welded with the system of the first embodiment explained above. FIG. 7 shows another example where two stainless steel plate are spot welded in the same way as in FIG. 6. The above figures indicate that it is possible to make the electrode voltage roughly correspond to the reference voltage curve for each cycle by selectively determining the control loop gain of the welding system, as shown by marks o. In these figures, the marks x show a case where the loop gain is excessive, and the marks Δ that where it is insufficient.

In the above embodiments, the voltage between the welding electrodes is controlled; it is possible alternatively to control the integral of electrode voltage, for even more stable quality, especially when the supply voltage fluctuates greatly.

Figure 8:
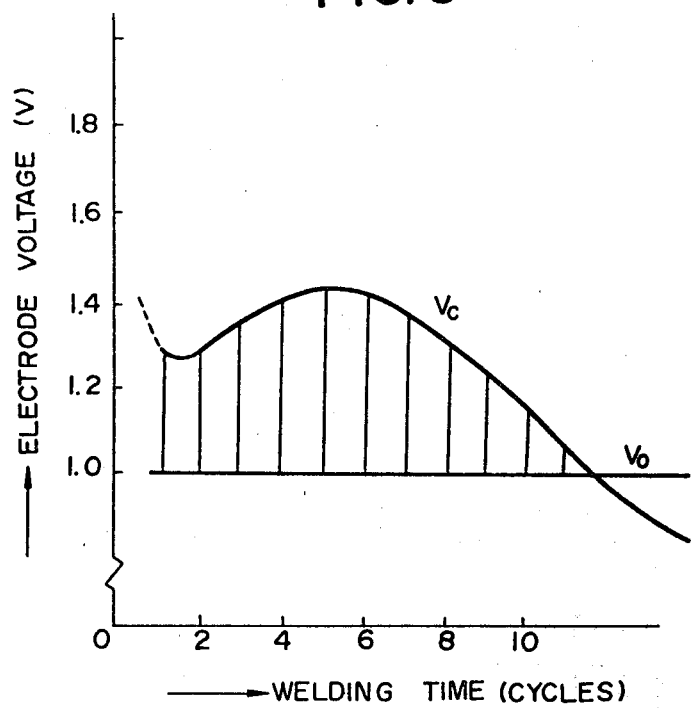
FIG. 8 is a graph explaining how to obtain the integral of electrode voltage with respect to welding time, being the basis of a second embodiment of the present invention.
Figure 9:
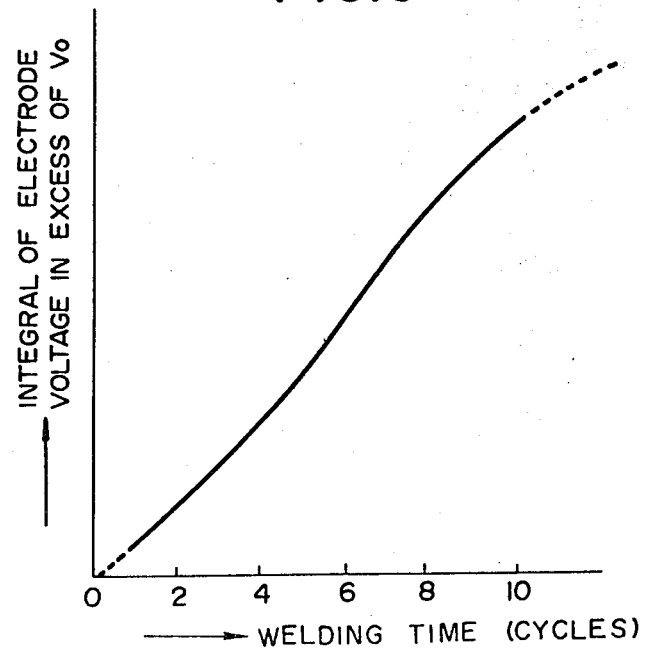
FIG. 9 is an example of a voltage integration curve of electrode voltage.

FIG. 8 show how to obtain the above integral of the electrode voltage, and explains the fundamental concept of the second embodiment.

Figure 10:
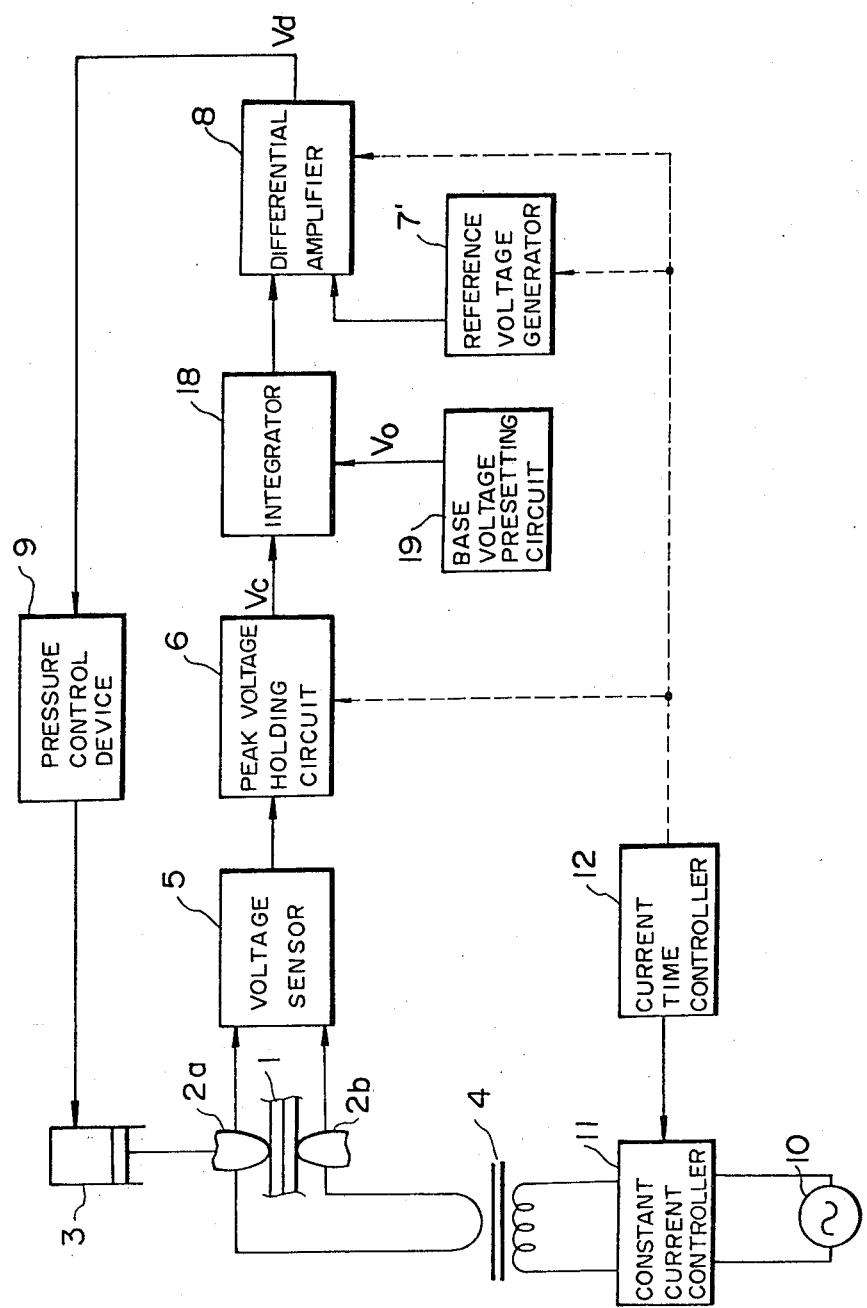
FIG. 10 is a schematic block diagram of the system of a second embodiment of the present invention.

As shown in this figure, the electrode voltage $V_c$ between the welding materials is detected while the welding current is flowing in the same way as in the above mentioned embodiment, and the voltage difference $(V_c - V_o)$ is integrated, with respect to the time when the current is flowing, only when the detected voltage $V_c$ exceeds a predetermined level voltage $V_o$. FIG. 10 shows an example of the voltage integration curve thus obtained.

The second embodiment of the present invention controls the electrode voltage in accordance with a voltage integration curve previously stored in an appropriate unit so as to obtain good welding quality.

FIG. 10 shows a schematic block diagram of the second embodiment of the present invention.

Figure 11:
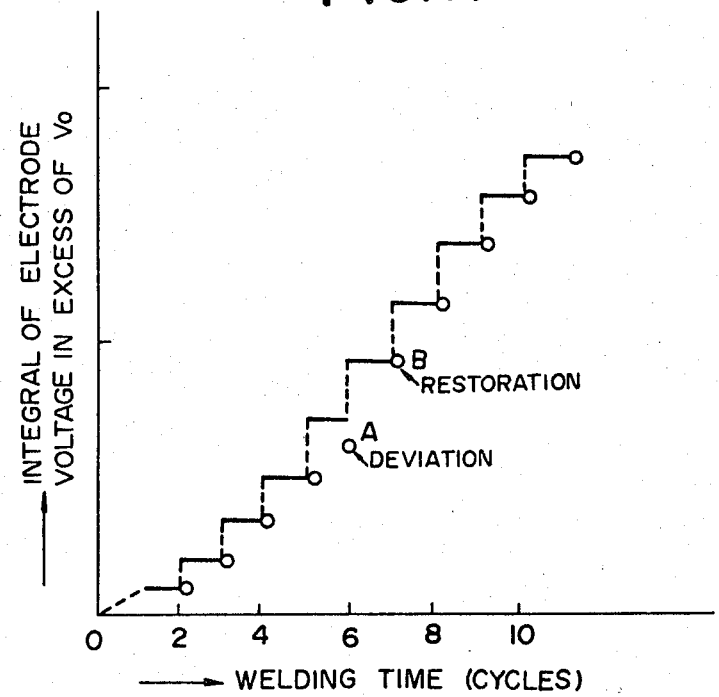
FIG. 11 is a diagram of assistance in explaining the operation of FIG. 10.

In contrast to the embodiment shown in FIG. 4, there are further provided an integrator 18, and a base voltage presetting circuit 19. In addition, a reference voltage integration curve as shown by solid bars in FIG. 11 is previously stored in the reference voltage generator 7' to output a series of reference voltage integral values for each welding cycle.

In this embodiment, the integrator 18 integrates the voltage difference between $V_c$ and $V_o$ only when the half-wave peak value $V_c$ of the electrode voltage outputted from the voltage peak-value holding circuit 6 exceeds the base voltage $V_o$ predetermined by the base voltage presetting circuit 19. These integration values are shown by marks o in FIG. 11.

The integration value outputted from the integrator 18 is compared with the reference voltage outputted from the reference voltage generator 7' in the differential amplifier 8, and the pressure controller 9 is actuated to control the pressure between the electrodes 2a and 2b, in the same way as in FIG. 4, in accordance with the signal $V_d$ corresponding to the difference. Therefore, even if the value of integral deviates, for example, to a position A shown by a mark o in FIG. 11, it is possible to correct the value to a position B so as to follow the reference voltage integration curve.

Figure 12:
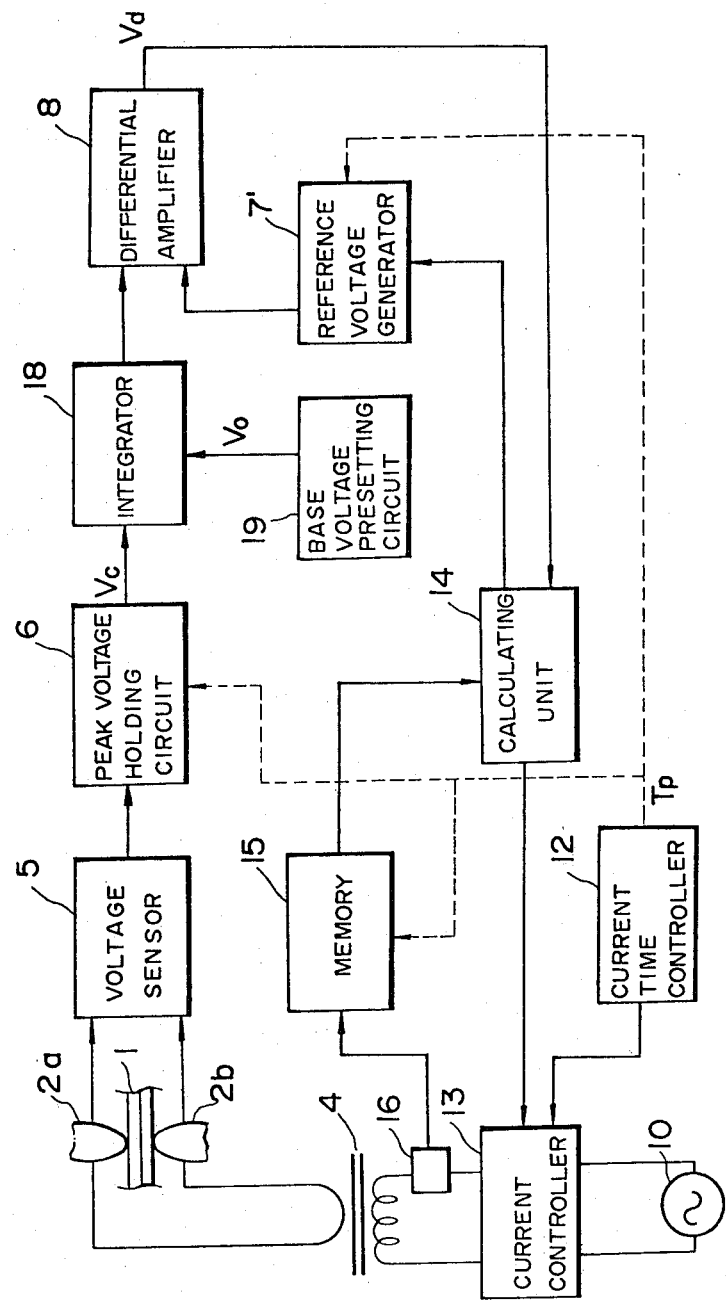
FIG. 12 is a schematic block diagram of the system of a third embodiment of the present invention.

FIG. 12 shows a schematic block diagram of the third embodiment of the present invention, by which the welding voltage is controlled by detecting the welding current instead of welding pressure.

In the figure, the numeral 13 denotes a current controller, including controlled rectifiers such as thyristers or triacs, for controlling the welding current. The numeral 14 denotes a calculating unit, is denotes a memory, and 16 denotes a current sensor such as a current transformer.

In this case, since one- or two-cycle initial firing phase angles for the controlled rectifiers are previously stored in the memory 15, the initial welding current is controlled in accordance with these stored phase angles immediately after starting. After that, however, since the current time controller 12 outputs a start signal $T_p$ to the memory 15 and the peak voltage holding circuit 6, the memory 15 begins to store the firing phase angle of the preceding current waveform detected by the current sensor 16; the calculating unit 14 calculates an appropriate firing phase angle depending on an output signal $V_d$ from the differential amplifier 8 and a signal from the memory 15 and sends out the calculated results to the current controller 13, so that the welding voltage between the electrodes follows the reference voltage integration curve stored in the reference voltage generator 7'.

At the start, in this embodiment, since the current controller 13 is controlled by the signal calculated depending on the initial firing phase angles stored in the memory 15, disregarding the output signal $V_d$ from the differential amplifier 8, it is possible to prevent erroneous operation caused by an abnormally large initial electrode voltage due to an increase in contact resistance between a pair of welded plates.

On the other hand, even if the temperature distribution is the same for materials to be welded, the electrode voltage changes as the firing phase angle of welding current changes. Therefore, it is necessary to corect the reference voltage generator 7' in accordance with the firing phase angle. For this reason, as shown in FIG. 12, the firing phase angle of welding current stored in the memory 15 is transferred to the reference voltage generator 7' through the calculating unit 14.

In the above embodiments, operations have been explained in the case where alternating current is used with a sampling method by selecting the half-wave peak values as the representative points; however, it is also possible to use direct current in a continuous control method.

In addition, operation has been explained in application to spot welding, but it is also possible to apply this invention to other resistance welding such as projection welding, seam welding, flash welding, upset butt welding, etc., as will be easily understood by those skilled in the art.

As explained above, according to the system and the method of the present invention, since the welding pressure between the two electrodes between which members to be welded are pinched is controlled during the welding process so as to obtain a desired stable quality, it is possible to do away with the repair processes for welded parts, and to reduce remarkably the ratio of defective products without wasting parts or products, with the result that welding productivity is remarkably improved.

Further, since the pressure control between the electrodes is especially effective for the prevention of surface flash or burr at the welded portion, it is possible to improve the safety and appearance of products.

Furthermore, since the integration value of voltages difference between the electrodes which exceeds a base voltage can be controlled so as to follow a reference voltage integration curve (a curve necessary to obtain a stable good welding quality), it is possible to ensure a remarkably good welding quality even in cases where the supply voltage fluctuates considerably.

It will be understood by those skilled in the art that the foregoing description is in terms of preferred embodiments of the present invention wherein various changes and modifications may be made without departing from the spirit and scope of the invention, which is to be defined by the appended claims.

What is claimed is:

1. A control system for welding, which comprises:
   (a) a voltage sensor for detecting the voltage $V_c$ between a pair of welding electrodes between which members to be welded are pinched while a welding current is flowing;
   (b) a base voltage presetting circuit for previously setting a desired base voltage $V_o$;
   (c) an integrator for integrating the difference between the voltage $V_c$ detected by said voltage sensor and the base voltage $V_o$ preset in said base voltage presetting circuit with respect to welding time only when each half-wave peak valve of the detected voltage $V_c$ exceeds the base voltage $V_o$;
   (d) a reference voltage generator for generating a series of predetermined reference welding voltages based on a reference voltage integration curve with respect to welding time;
   (e) a differential amplifier which compares the voltage $V_c$ detected by said voltage sensor with the voltage based on the reference voltage integration curve and outputs a control signal $V_d$ in response to the difference between the two voltages;
   (f) a current controller for controlling the welding current in the manner of firing phase angle;
   (g) a current sensor for detecting the welding current from said current controller;
   (h) a memory for storing initial firing phase angle values and for storing the preceding firing phase angle of the welding current detected by said current sensor; and
   (i) a calculating unit for calculating an appropriate firing phase angle depending on an output signal $V_d$ from the differential amplifier and a signal from said memory and for outputting the calculated result to said current controller;
   whereby the welding voltage between the electrodes is controlled by changing the firing phase angle of the welding current, in accordance with the predetermined reference voltage integration curve, so as to obtain a stable welding quality.

2. A control system for welding as set forth in claim 1, which further comprises:
   (a) a peak voltage holding circuit for holding each half-wave peak value of the detected voltage for a half cycle, disposed between said voltage sensor and said integrator; and
   (b) a current-time controller for outputting a start-stop signal to said current controller and for outputting a start signal $T_p$ to said reference voltage generator, said memory, and said voltage peak-value holding circuit,
   whereby the system is controlled with a time delay at the start so as to prevent initial erroneous operation.

3. A control method of welding, which comprises:
   (a) detecting the voltage $V_c$ between a pair of welding electrodes between which members to be welded are pinched and through which an AC welding current is flowing;
   (b) setting a base voltage $V_o$;
   (c) integrating the voltage difference between the detected voltage $V_c$ and the base voltage $V_o$ only when each half-wave peak value of the detected voltage $V_c$ exceeds the level voltage $V_o$,
   (d) generating a series of predetermined reference welding voltages based on a reference voltage integration curve with respect to time measured in cycles of the welding current;
   (e) comparing the voltage difference between the integrated voltage and the predetermined reference voltage integration curve;
   (f) detecting the welding current;
   (g) storing the preceding firing phase angle of the detected welding current;
   (h) calculating an appropriate firing phase angle depending on the voltage difference $V_d$ between the integrated voltage and the predetermined reference voltage integration curve, and the stored preceding firing phase angle of the welding current; and
   (i) controlling the welding current in accordance with the calculated results,
   whereby the welding voltage between the electrodes is controlled, by changing the firing phase angle of the welding current, in accordance with the predetermined reference voltage integration curve so as to obtain a stable welding quality.

4. A control method of welding as set forth in claim 3, which further comprises:
(a) holding each half-wave peak value of the detected voltage for a half-cycle before comparison of the voltages;
(b) outputting a start-stop signal for synchronization;
(c) storing initial firing phase angles of the welding current for calculating the initial welding current; and
(d) correcting the reference voltage integration curve according to the detected firing phase angle.

* * * * *